Jan. 16, 1962 V. C. BELT 3,017,189
POWER-DRIVEN SPREADER APPARATUS FOR FERTILIZER OR THE LIKE
Filed April 8, 1960 5 Sheets-Sheet 1

INVENTOR.
VERNON C. BELT
BY- MAHONEY, MILLER
& RAMBO
BY- *W. H. Rambo*
ATTORNEYS.

Jan. 16, 1962    V. C. BELT    3,017,189
POWER-DRIVEN SPREADER APPARATUS FOR FERTILIZER OR THE LIKE
Filed April 8, 1960    5 Sheets-Sheet 2
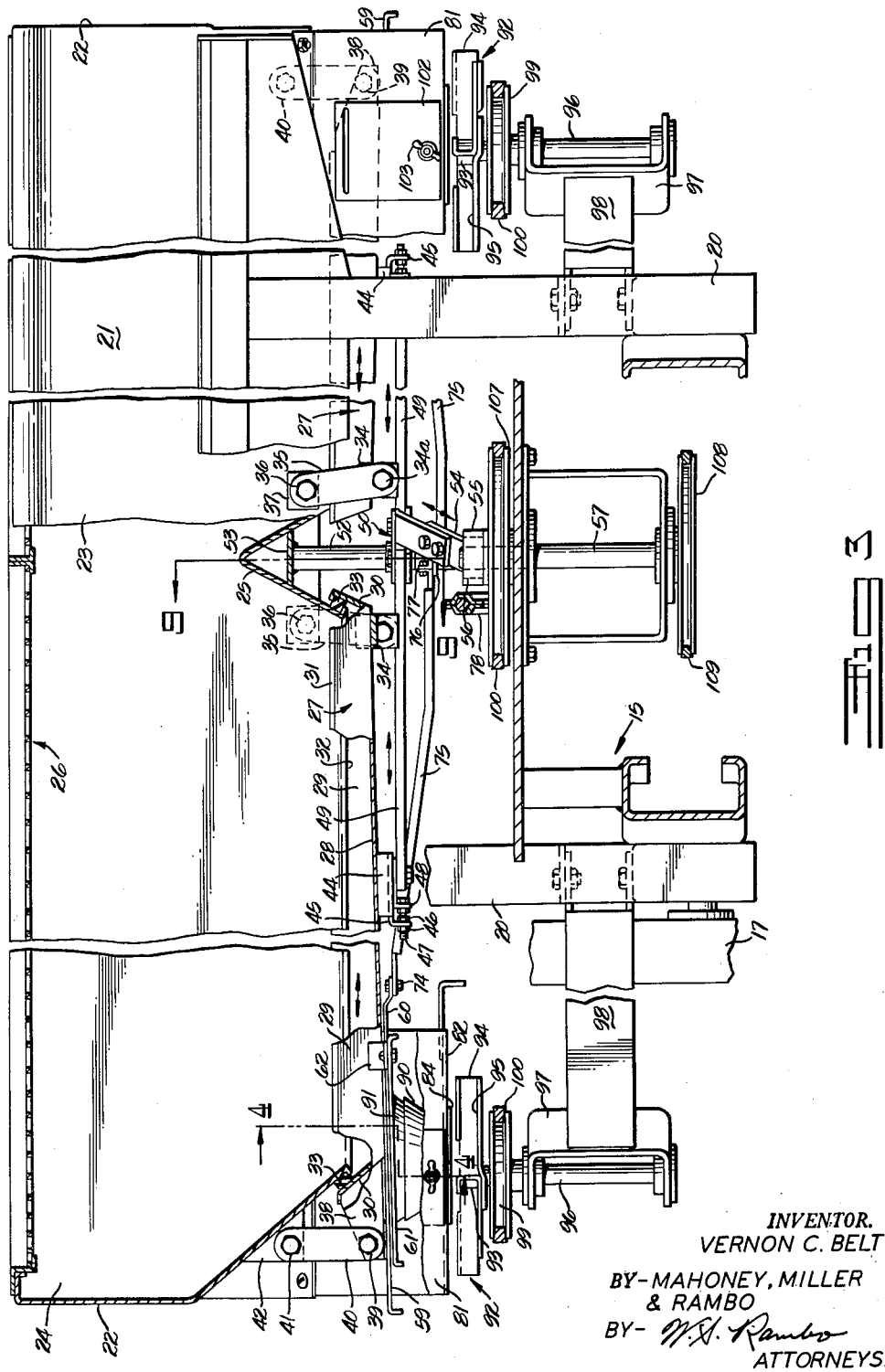
INVENTOR.
VERNON C. BELT
BY- MAHONEY, MILLER
& RAMBO
BY- W.H. Rambo
ATTORNEYS.

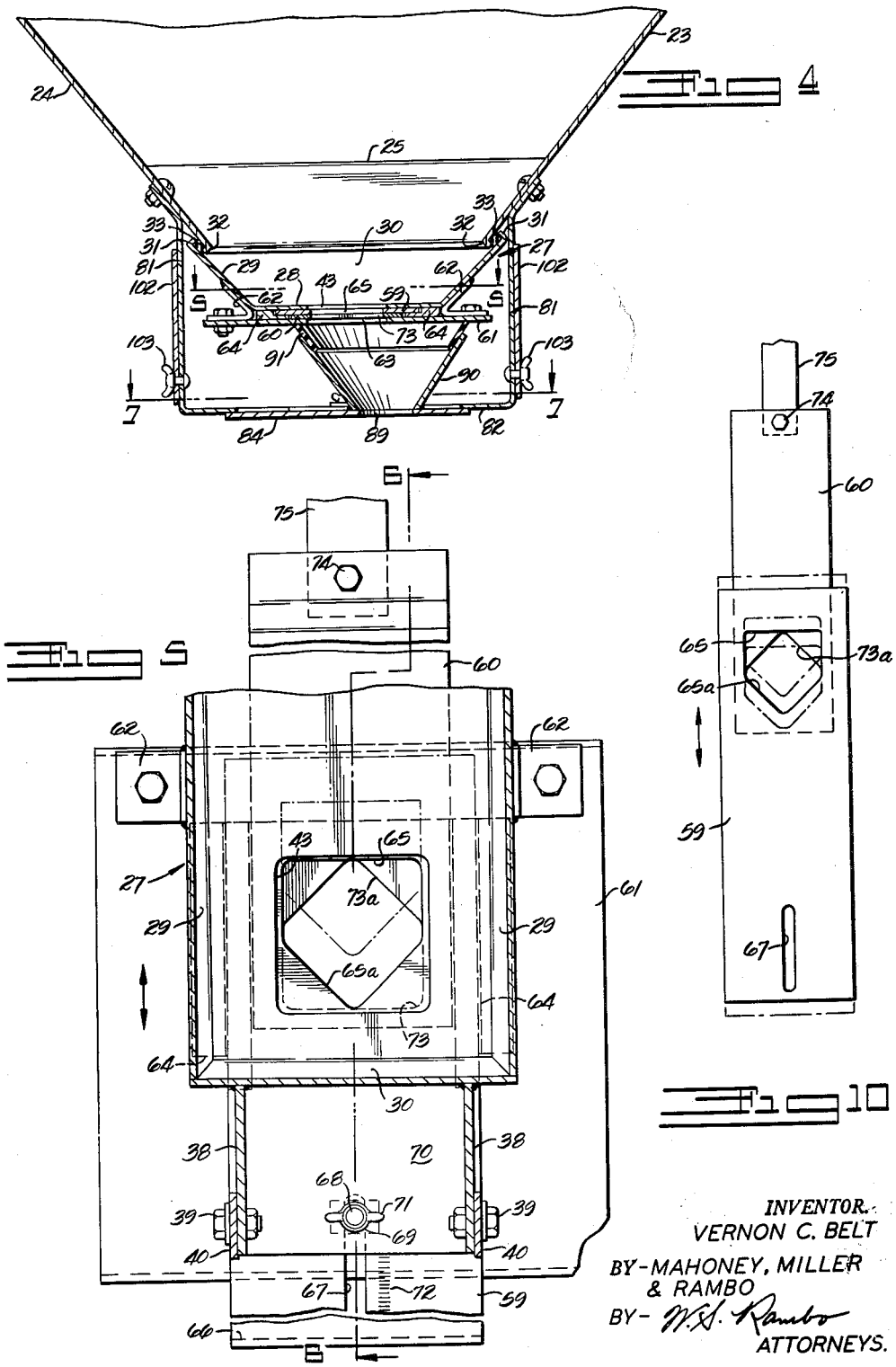

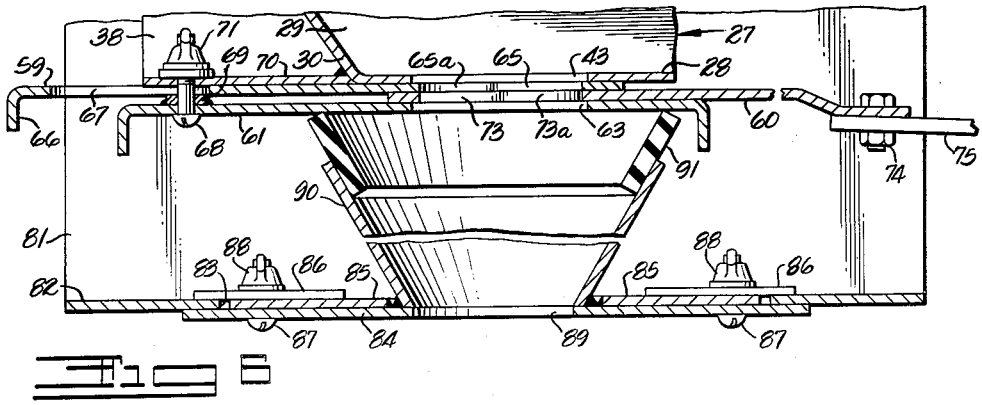

Jan. 16, 1962  V. C. BELT  3,017,189
POWER-DRIVEN SPREADER APPARATUS FOR FERTILIZER OR THE LIKE
Filed April 8, 1960  5 Sheets-Sheet 5
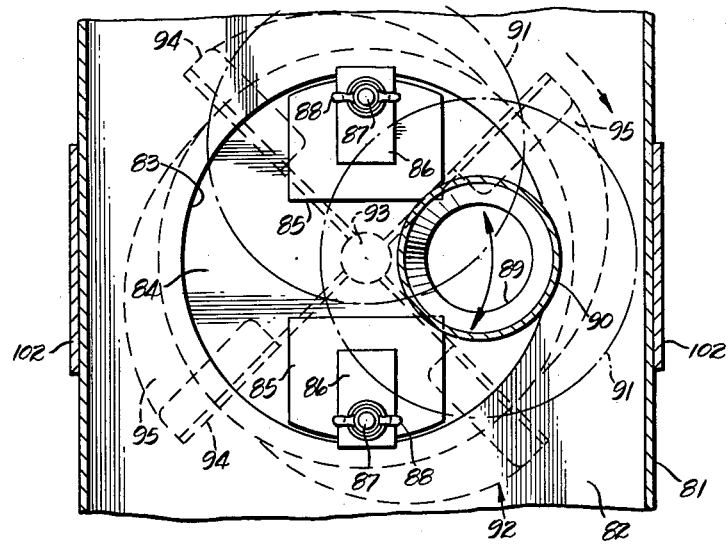
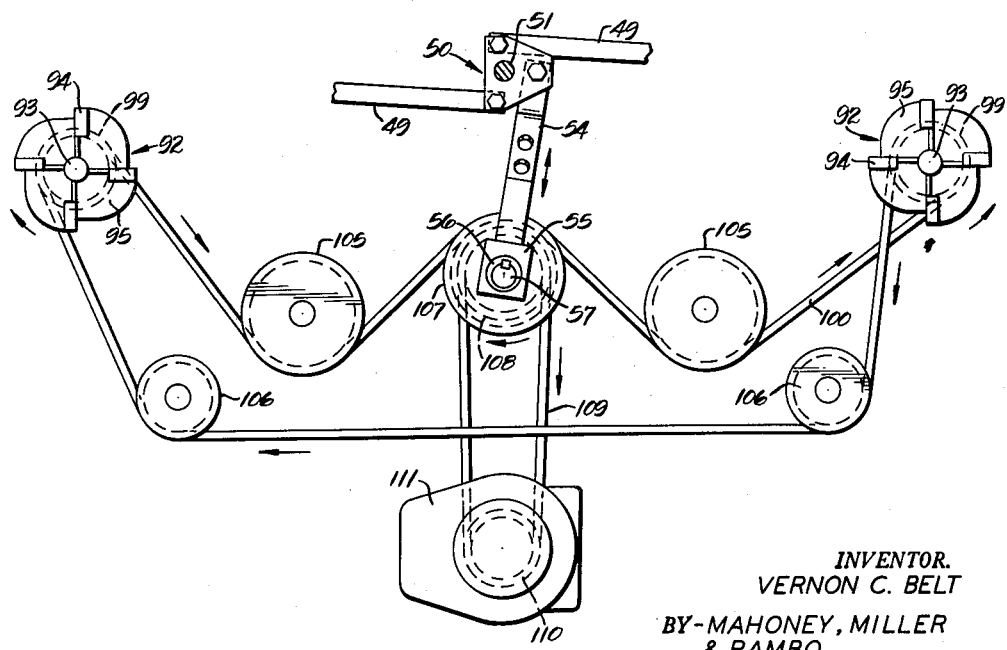
INVENTOR.
VERNON C. BELT
BY- MAHONEY, MILLER
& RAMBO
ATTORNEYS.

United States Patent Office 3,017,189
Patented Jan. 16, 1962

3,017,189
POWER-DRIVEN SPREADER APPARATUS FOR FERTILIZER OR THE LIKE
Vernon C. Belt, Orient, Ohio, assignor to The Belt Corporation, Orient, Ohio, a corporation of Ohio
Filed Apr. 8, 1960, Ser. No. 20,947
8 Claims. (Cl. 275—8)

The present invention relates generally to spreaders for pulverulent materials, such as chemical fertilizers, insecticides, herbicides, and the like. More particularly, this invention deals with an improved vehicular-drawn spreader of the type including a wheel-mounted frame, a material-receiving hopper and power-driven rotary distributor fans or impellers arranged beneath the outlets of the hopper to centrifugally broadcast materials discharged from the hopper in a fan-like pattern over the terrain traversed by the spreader.

In the past, various different types of fertilizer and seed spreaders have been proposed for use, including the so-called "broadcast"-type of commercial spreader which comprised a tractor-drawn implement embodying a wheel-mounted frame, a material-receiving hopper carried on the frame and having one or more outlets, and power-driven, rotary fans or impellers so arranged as to receive materials discharged from the outlet or outlets of the hopper and to centrifugally broadcast such materials in an arcuate or fan-like pattern over the terrain traversed by the spreader implement. However, in the larger capacity, commercial-types of broadcast spreaders of which I am aware, it has been extremely difficult, if not impossible, to accurately control the rate of discharge of materials and, consequently, the density of the pattern of materials broadcast by such spreaders. As will be understood, non-uniformity in the pattern of materials broadcast by spreaders of this type results either in an excess of material per unit area of terrain, or a deficiency of material per unit area, with consequent loss of economy due to burning of plant life and waste of fertilizer in the case of an excess of material per unit area, or to insufficient feeding of plant life in the case of a deficiency of material per unit area. Further, certain of the so-called broadcast-types of fertilizer spreaders or distributors of which I am aware utilize in their construction one or more power-driven augers located within the hopper for the purpose of feeding materials to the hopper outlets. These auger-feeding spreaders, by and large, are relatively heavy, structurally cumbersome, and require considerable power in their operation, and thus are comparatively expensive for their intended purpose.

Accordingly, it is the primary object of the present invention to provide an improved broadcast-type spreader or distributor for pulverulent materials which is characterized by its efficiency in controlling and maintaining a given, desired rate of discharge of materials per unit area of terrain traversed by the spreader.

Another object of this invention is to provide a broadcast-type spreader of this character which embodies improved means for feeding materials deposited in the hopper of the spreader to the outlets of the hopper and to the rotary scattering fans or impellers, to thus insure uniformity in the rate of discharge of materials from the hopper and in the pattern of materials deposited upon the terrain.

A further object of this invention is to provide a broadcast-type spreader or distributor for fertilizer or the like having a manually adjustable valve system which may be easily and quickly adjusted to obtain an optimum pattern density for a given operation, and wherein means are provided to accurately measure the actual rate of discharge of materials for a given setting of the valve system, prior to the actual operation of the spreader, to thereby determine the accuracy of adjustment of the valve system.

Still another object of the present invention is to provide a broadcast-type spreader of this character which comprises a material-receiving hopper formed with an open bottom which is closed by a pair of power-driven vibratory shaker pans so mounted and arranged in respect to the hopper as to cause materials deposited in the hopper to be positively conveyed outwardly toward a pair of valve controlled outlets located adjacent the opposite ends of the hopper, to thereby insure a uniform rate of discharge of materials onto the associated rotary scattering fans or impellers.

Yet another object of the invention is to provide a spreader of this character, wherein the vibratory shaker pans, which form the bottom of the hopper, are provided at opposite ends of the hopper with discharge outlets or ports which vibrate or move in association with the shaker pans and in respect to relatively stationary shutter members in a manner to prevent the bridging or clogging of materials within the discharge ports and to thereby insure the free gravitation flow of materials through such ports for distribution by the associated scattering fans or impellers.

For a further and more detailed understanding of the invention, reference is made to the following description and the accompanying drawings, wherein:

FIG. 3 is a medial, longitudinal, vertical sectional view, partially in elevation, taken through the hopper;

FIG. 4 is a detailed vertical sectional view taken along the line 4—4 of FIG. 3;

FIG. 5 is a fragmentary horizontal sectional view taken along the line 5—5 of FIG. 4 and illustrating one of the discharge ports and associated valve and shutter devices;

FIG. 6 is a detailed vertical sectional view taken along the line 6—6 of FIG. 5 and illustrating the relationship of the adjustable valve and shutter devices to one of the discharge ports of the hopper;

FIG. 7 is a detailed horizontal sectional view taken along the line 7—7 of FIG. 4 and illustrating how the discharge funnel or spout may be adjusted with respect to its associated material-scattering fan;

FIG. 8 is a diagrammatic plan view of the driving assembly for the shaker pans and material-scattering fans;

FIG. 9 is a transverse, vertical, sectional view taken along the line 9—9 of FIG. 3;

FIG. 10 is a diagrammatic view illustrating the relative movement between the valve plates and shutter plates associated with each of the material-discharging ports of the hopper; and FIG. 11 is an exploded perspective view showing the valve and shutter arrangement associated with each discharge outlet of the hopper.

Figure 1:
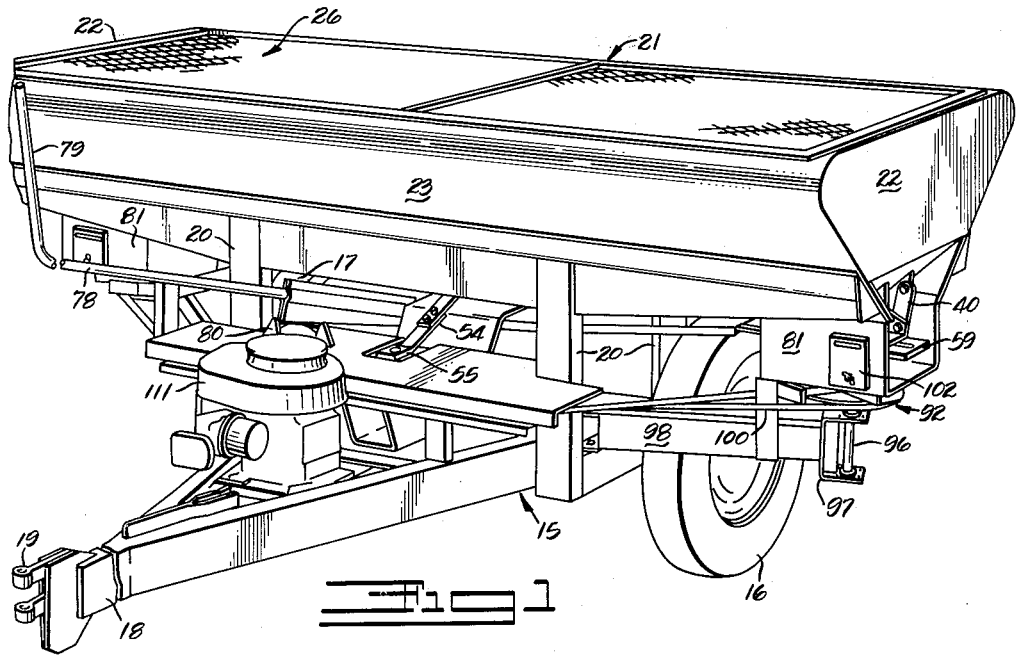
FIG. 1 is a perspective view of a broadcast-type spreader formed in accordance with the present invention.

Referring now to the drawings, the present spreading or distributing machine comprises a vehicular frame, indicated generally by the reference numeral 15, supported for rolling movement over the terrain by a pair of transversely spaced ground wheels 16 and 17. The frame 15 is formed to include a forwardly extending tongue 18 which terminates in a hitch or coupling 19 adapted to be connected with a tractor or other towing vehicle, not shown. The frame 15 further includes a plurality of upstanding posts 20 which support at the upper ends thereof an elongated, material-receiving hopper 21. The hopper 21 extends transversely above the frame 15 and outwardly beyond each of the ground wheels 16 and 17, and has its longitudinal axis disposed transversely of and perpendicular to the normal path of movement of the frame over the terrain.

The hopper 21 is of welded sheet metal construction and includes a pair of opposed, vertically arranged end walls 22, and inwardly sloping, downwardly convergent front and rear side walls 23 and 24, respectively. The hopper 21 is open along the bottom thereof except in its lower central region which is formed with a relatively shallow, inverted V-shaped, partition wall 25. The partition wall 25 extends transversely between the front side wall 23 and rear side wall 24 of the hopper and projects a short distance upwardly into the lower central portion of the hopper to divide the latter internally into a pair of relatively separated, opposite end sections. The hopper 21 is further provided at the upper open end thereof with a removable, perforate grating or screen 26 which functions to screen or exclude any relatively large size foreign objects which might otherwise be introduced into the hopper when the same is filled or loaded with fertilizer or other pulverulent materials to be distributed or spread by the machine.

As will be seen, particularly by reference to FIGS. 3 and 4 of the drawings, the open bottoms of the opposite end sections of the hopper are closed by a pair of relatively spaced apart, longitudinally aligned shaker pans 27. Each of the shaker pans 27 is identical in construction and comprises a relatively shallow trough-shaped body having a downwardly and outwardly inclined bottom wall 28, downwardly inclined side walls 29 and upstanding, inwardly inclined end walls 30. The upper edges of the side walls 29 of each shaker pan 27 are formed with inwardly turned lips 31 (see FIG. 4) disposed in spaced, overlapping relation to outwardly turned flanges 32 formed along the lower edges of the front and back side walls 23 and 24 of the hopper. Positioned between the lips 31 and flanges 32 are resiliently flexible sealing strips 33 which function to prevent the escape of materials along the edges of the shaker pans. So, also, the end walls 30 of the shaker pans are sealed with respect to the lower edges of the end walls 22 of the hopper and the lower edges of the partition wall 25 by means of resiliently flexible gaskets or sealing strips 33 which are secured to and depend from the lower edges to the end walls 22 and the partition wall 25 of the hopper. The gaskets 33 provide effective seals between the edges of the shaker pans 27 and the lower edges of the bottom of the hopper, but at the same time do not interfere with limited reciprocating movement of the shaker pans, due to the inherent resiliency of the gaskets.

Each of the shaker pans 27 is supported at the inner end thereof by a strap-like bracket 34 (see FIG. 9) which is bolted to the under portion of the shaker pan, and which is formed at the opposite ends thereof with a pair of downwardly turned eye formations which are pivotally connected, as at 34a, with the lower ends of a pair of rocker arms 35. The upper ends of the rocker arms 35 are pivotally connected, as by means of bolts 36, with angle brackets 37 which are welded to the front and back side walls of the hopper 21. As will be noted, the rocker arms 35 are disposed at a slight angle with respect to the vertical and are inclined slightly outwardly toward the opposite ends of the hopper for a purpose which will be hereinafter explained. The outer end of each of the shaker pans 27 is formed to include a pair of rigid transversely spaced ears 38 which are pivotally secured, by means of bolts 39, to the lower ends of a second set of substantially vertically arranged rocker arms 40. The upper ends of the rocker arms 40 are pivotally secured by bolts 41 to a set of ears 42 which are secured to and depend from the outer surface of the end walls 22 of the hopper 21. Thus, as indicated by the double-headed arrows of FIG. 3, each of the shaker pans 27 is supported by the spaced sets of rocker arms 35 and 40 for limited, short stroke, reciprocating movement longitudinally beneath the open bottoms of the opposite end sections of the hopper. Also, as will be apparent in FIG. 3 of the drawings, the bottom wall 28 of each shaker pan is inclined slightly downwardly and outwardly toward the respective ends of the hopper, and each bottom wall 28 is formed adjacent the outer end thereof with a rectangular discharge port 43 (see FIGS. 5 and 6).

Welded to the underside of the bottom wall of each shaker pan 27, intermediate the ends thereof, is a U-shaped connector bracket 44 which includes a down turned eye 45. Adjustably secured to the eye 45, as by means of clamping nuts 46, is a screw-threaded bolt 47. The inner headed end of the bolt 47 is engaged and securely clamped to an angle bracket 48 which, in turn, is bolted to the outer end of a shaker pan-actuating arm or bar 49. Thus, by adjusting the nuts 46, the point of connection of the actuating arm 49 with the shaker pan may be varied to assure freedom of movement of the shaker pan. The inner ends of the shaker pan-actuating arms 49 extend inwardly beneath the central portion of the hopper and are pivotally secured, respectively, to opposite sides of a bell crank plate 50 (see FIG. 9). The bell crank plate, in turn, is pivotally supported in its central region upon a vertically arranged shaft or post 51 which is carried by and extends downwardly from a stationary sleeve 52 welded at its upper end to a cross web 53 of the partition wall 25. Also pivotally connected with the bell crank plate 50, in offset relation to the shaft 51, is the outer end of a sectional connector rod or bar 54. The inner end of the connector rod 54 terminates in a relatively enlarged journal boss 55 formed with a circular bore in which is rotatively received an eccentric 56 which is keyed to a vertically arranged master drive shaft 57. Thus, upon rotation of the shaft 57, the eccentric 56 serves to impart reciprocating movement to the connector rod 54 which, in turn, oscillates the bell crank plate assembly 50 to cause opposite reciprocating movement to be imparted to the shaker pans 27 through the actuating or drive arms 49. Preferably, the arrangement of the eccentric 56 and the associated motion-transmitting linkage to the shaker pans is such that the linear reciprocating movement of the pans is relatively slight and of the order of from one-eighth to one-fourth inch. Thus, when the master drive shaft 57 is driven at relatively high speed, the shaker pans 27 function after the manner of high-speed vibrating conveyors to cause materials deposited in the hopper to be conveyed outwardly toward the discharge ports 43 of the shaker pans which are disposed, respectively, toward the opposite ends of the hopper. By initially arranging the inner sets of rocket arms 35 at a slight angle with respect to the vertical and directed slightly outwardly toward the opposite end of the hopper, and with the outer sets of rocker arms initially disposed in substantially vertical planes, the bottom walls 28 of the shaker pans 27 will have a slight upward component of movement when the shaker pans are moved in outward directions by the arms 49, and a slight downward component of movement when the shaker pans are moved on their inward strokes by the arms 49. The combined upward and outward and downward and inward components of movement of the bottom walls of the shaker pans, particularly at relatively high speed reciprocation of the drive arms 49, causes the pulverulent materials positioned in the hopper to be incrementally, but positively, shifted outwardly from the central regions of the hopper toward the discharge ports 43 of the shaker pans, even if the hopper be tilted at an angle with respect to the horizontal, such as might occur during the passage of the ground wheels 16 and 17 over uneven terrain.

Slidably carried in superposed relation beneath the discharge port 43 of each shaker pan 27 is a manually adjustable, metering valve plate 59 and a cut-off valve or shutter plate 60. As will be seen, particularly in FIG. 11, the valve plate 59 and shutter plate 60 are of generally flat, rectangular configuration and are supported for longitudinal sliding movement between the bottom wall 28 of the shaker pan 27 and a relatively vertically spaced lower cross plate 61 which is rigidly bolted at either side thereof to sets of angle brackets 62 welded to the side walls 29 of the shaker pan. The cross plate 61 is formed with a rectangular discharge opening 63 of the same size and configuration as the discharge port 43 of the shaker pan 27, and the opening 63 is disposed in vertical registry with the discharge port 43. The side edges of the valve plate 59 and the shutter plate 60 are guided against lateral movement between a pair of relatively stationary guide bars 64 which are positioned between the bottom wall 28 of the shaker pan and the lower cross plate 61. As will be noted particularly in FIG. 11, the valve plate 59 is formed toward its inner end with an opening 65 of relatively smaller area than the discharge port 43. The opening 65 is bounded toward the outer end of the valve plate by a V-shaped wall 65a. The valve plate 59 is also formed at the outer end thereof with a downturned lip 66 which provides a convenient handle by which the plate 59 may be grasped to slide the same relative to the shaker pan 27 and thereby adjust the relative position of the opening 65 with respect to the axis of the discharge port 43. The valve plate 59 is further formed with an elongated, occluded slot 67 through which extends the intermediate shank portion of a clamping bolt 68. As seen particularly in FIG. 6, the bolt 68 passes upwardly through the cross plate 61, a circular spacer 69, the slot 67 of the valve plate, and then through a cross web 70 formed between the ears 38. The upper end of the bolt 68 is threaded and is provided with a wing nut 71 which may be tightened upon the bolt to clamp the valve plate in a given position of adjustment. Preferably, the valve plate 59 is provided adjacent the slot 67 with suitable scale graduations 72 which are indexed to the outer edge of the cross web 70 and which serve to indicate various positions at which the valve plate may be placed to vary the rate of discharge of materials from the discharge port of the hopper.

The shutter plates 60 are also formed adjacent their outer ends with a multiangular opening 73 which is bounded toward the inner end of the shutter plate by a V-shaped wall 73a. Connected to the inner end of each of the shutter plates 60, as by means of a nut and bolt 74, is a shutter-actuating arm 75. The shutter-actuating arms are offset with respect to the shaker pan-actuating arms 49 and extend inwardly beneath the central portion of the hopper and have their inner ends pivotally connected with the opposite ends of a bell crank lever 76. The bell crank lever 76 is formed with a centrally located journal tube 77 which is pivotally mounted on the lower end of the pivot post or shaft 51. The bell crank lever 76 is connected to be oscillated by an elongated, forwardly extending rod 78 which terminates at its forward end in an upturned hand-gripping handle 79 disposed within easy reach of an operator riding upon an associated tractor or towing vehicle. Thus, by shifting the rod 78 laterally between opposite ends of a quadrant bracket 80 carried by the stationary frame of the machine, the bell crank lever 76 is oscillated in opposite directions to impart reciprocating movement to the shutter-actuating arms 75, and to thereby shift the shutter plates 60 between positions opening or closing the discharge openings 65 of the valve plates 59. In this regard, it will be understood that the shutter plates 60 function either to fully close off the flow of material through the openings 65 of the valve plates 59, or to open such openings 65 by placing the openings 73 in registry therewith. Toward this end, the manually operated rod 78, bell crank lever 76 and shutter-actuating arms are so arranged as to impart the necessary sliding movement to the shutter plates 60 to accomplish this purpose.

As seen particularly in FIG. 5 of the drawings, when the shutter plate 60 is moved to its open position, the V-shaped wall 73a defines one side of a diamond-shaped orifice which is located directly below the discharge port 43 formed in the bottom wall 28 of the shaker pan 27, while the V-shaped wall 65a of the adjustable valve plate 59 defines the opposite side of the diamond-shaped orifice. Thus, by loosening the wing nut 71 associated with the clamping bolt 68, the valve plate 59 may be pushed inwardly to any one of a number of adjusted positions to thus decrease the effective area or size of the diamond-shaped orifice and to thereby vary the rate of discharge of materials from the hopper. This adjustment of the valve plate 59 between substantially fully open and relatively restricted positions is indicated by dotted lines in FIG. 5.

Also, it will be noted that the clamping bolts 68 and wing nuts 71 function to securely clamp the valve plates 59 in their selected positions of adjustment to the cross webs 70 which are welded to the outer ends of the shaker pans 27. Thus, in the operation of the present machine, the valve plates are reciprocated or vibrated in unison with the shaker pans 27. However, the shutter plates 60, being carried by the actuator arms 75 and being slidable within the guide blocks 64, remain relatively stationary during the reciprocating or vibrating movement of the shaker pans and valve plates. Accordingly, as the valve plates 59 vibrate relative to the shutter plates 60, the V-shaped walls 65a move slightly inwardly and outwardly with respect to the V-shaped walls 73a of the shutter plates to impart a limited shearing or cutting action of the diamond-shaped orifices. This cutting action is illustrated generally by dotted lines in FIG. 10 and serves effectively to break up any relatively large size clumps or pieces of material which might otherwise tend to clog the discharge openings and prevent the bridging or packing of material particles across such openings.

Bolted to the front and back side walls 23 and 24 of the hopper, adjacent the outer ends thereof and in substantially encasing relation to the valve plate and shutter plate assemblies, are a pair of depending box frames 81. Each of the box frames 81 is formed with a horizontal bottom wall 82 disposed in vertically spaced relation to the cross plate 61 of the valve assembly. The bottom wall 82 of each box frame is formed in its intermediate region with a circular opening 83 which is closed at the underside thereof by a rotatably adjustable, funnel-supporting disk 84. The disk 84 is provided on diametrically opposite sides of its upper surface with a pair of guide blocks 85 whose outer marginal edges closely fit within the opening 83. Welded or otherwise secured to each of the guide blocks 85 is a radially outwardly projecting clamping finger 86 whose outer end projects outwardly in overlapping relation to the bottom wall 82 of the box frame, adjacent the opening 83. Extending through the disk 84, the guide block 85 and finger 86 is a screw-threaded clamping bolt 87 which carries at the upper end thereof a wing nut 88. Thus, by loosening the nuts 88 upon the bolt 87, the disk 84 may be adjustably rotated with respect to the bottom wall 82 of the box frames 81. Welded to the upper surface of each of the disks 84, in encircling relation to a circular opening 89 formed therein and in offset relation to the axis of rotation of the disk, is the lower end of an upwardly projecting, frusto-conical funnel or spout 90. The upper, wider end of the funnel or spout 90 is provided with a relatively telescoping extension gasket or ring 91 of resiliently flexible material. The upper open end or mouth of the funnel gasket 91 is disposed in abutting relation to the under surface of the cross plate 61 and in relatively widely encompassing relation to the discharge opening 63 thereof. Thus, the funnels 90 and gaskets 91 function to direct materials discharged by gravity from the discharge ports 43 of the shaker pans and their associated valve openings downwardly to the discharge openings 89 formed in the adjustable disks 84. As the same time, due to the relatively wide, open mouths of the gaskets 91, with respect to the smaller size of the openings 63, the disks 84 may be rotatably adjusted with respect to the bottom wall 82 without interrupting communication of the funnels with the discharge openings 63 of the cross plates 61. As will hereinafter be made apparent, the rotative adjustment of the disks 84 is for the purpose of adjusting the point of discharge of materials circumferentially with respect to a pair of rotary, centrifugal scattering fans or impellers 92 which are normally arranged for rotation beneath the bottom walls 82 of the box frames 81.

Figure 2:
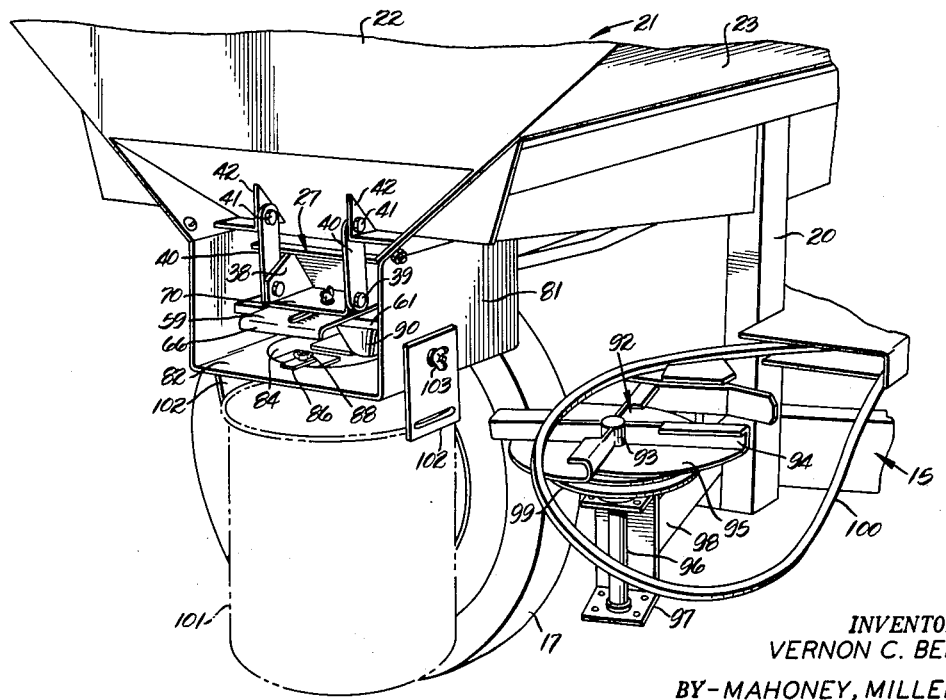
FIG. 2 is an enlarged, fragmentary, perspective view of one end portion of the spreader showing the associated material-scattering fan or impeller assembly moved to an inoperative position, and illustrating how a measuring can may be attached beneath the discharge outlet of the hopper to calibrate the actual rate of discharge of materials from the hopper.

As will be noted particularly in FIGS. 2 and 3, each of the material scattering fans or impellers 92 comprises a centrally disposed hub portion 93 and a series of radially projecting blade members 94 each of which includes a horizontal web or pan portion 95. The hub portion 93 of each impeller is drivingly connected with the upper end of a vertically arranged shaft 96 which is rotatively journalled in a U-shaped bracket 97 carried at the end of an arm 98 which is pivotally connected with an upstanding post 20 of the vehicular frame 15. Drivingly connected with the shaft 96, directly beneath the impeller 92, is a belt pulley 99 which is adapted to be driven in rotation by a flexible drive belt 100. By reference to FIG. 2 of the drawings, it will be seen that each of the impeller or fan-supporting arms 98 is arranged to swing in a horizontal plane from a normally operative position, wherein its associated fan or impeller is disposed directly below the discharge outlet 89, as shown in FIG. 1, to an inoperative position, as shown in FIG. 2, wherein the arm 98 and its associated fan or impeller are disposed well forwardly of and out of registry with respect to the discharge outlet 89. Thus, by swinging the impeller assemblies forwardly to their inoperative positions, as shown in FIG. 2, sufficient space is provided beneath the discharge outlets in which may be suspended a bucket or other receptacle 101 to receive therein materials discharged from the hopper. Advantageously, a pair of bucket-supporting brackets 102 are pivotally carried, by means of bolts and wing nuts 103, on each side of the box frame 81, and these brackets 102 may be swung downwardly to engage and support the upper rim of the bucket 101.

As will be readily understood, the purpose in positioning the buckets 101 beneath the discharge outlets of the hopper is to provide a simple, yet efficient, means of accurately calibrating the rate of discharge of any given pulverulent material from the hopper at any given position of adjustment or setting of the valve plates 59. For example, while the valve plates 59 may be provided with the scale graduations 72 to indicate various sizes of openings provided by the valve plates, it is a practical impossibility to predetermine the rate of flow of various different types of pulverulent materials at a given valve setting, due to difference of particle size, density, etc. Thus, by collecting and measuring the actual quantity of a given pulverulent material discharged from the hopper in a given time and a predetermined setting of the valve plates 59, the rate of flow of such material for such setting is then accurately known. By this means, an operator may accurately determine in advance of the actual spreading operation the proper position to which the valve plates must be adjusted to obtain a desired rate of flow of a given material. Knowing the rate of flow of material from the hopper, together with the speed of travel of the towing vehicle, the operator may then accurately spread or distribute the desired quantity of a given material over the known area to be covered.

Once the rate of discharge has been determined, the calibrating buckets 101 are removed from the spreader and the impeller or fan assemblies 92 and their supporting arms 98 are returned to and locked in their operative positions beneath the discharge outlets 89. In their operative positions, the fans or impellers 92 are adapted to be driven in relatively high speed rotation by the belt 100, and function to centrifugally scatter pulverulent materials deposited thereon in generally fan-shaped patterns extending outwardly from the rear and both sides of the spreading machine. The direction of the fan-shaped patterns of materials relative to the spreading machine may be varied within limits by adjusting the funnel-supporting disks 84, so as to vary circumferentially the point of deposit of materials upon the fans.

FIG. 8 discloses the driving arrangement for the material-scattering fans 92 and the shaker pans. As will be noted, the drive belt 100 is continuous and is looped at the opposite ends thereof around the belt pulleys 99 associated with each of the fans 92, the belt being arranged to rotate the fans in opposite directions. In its intermediate regions, the belt 100 is trained about a series of relatively spaced idler pulleys 105 and 106 which are rotatably carried on shafts journalled in the frame 15. The belt engages and is driven by a centrally located drive pulley 107 which is keyed to the common driving shaft 57 below the eccentric 56. The shaft 57, in turn, has keyed to the lower end thereof a second belt pulley 108 about which is trained a drive belt 109 extending from a pulley 110 driven by a small horsepower gasoline engine 111 mounted on the frame 15. It will here be understood that the engine 111, pulleys 108 and 110 and belt 109 may be replaced by a suitable remotely extending jack shaft and power take-off connection, not shown, when it is desired to drive the common shaft 57 for the fan and shaker pan components of the machine through the power take-off shaft of a towing tractor, rather than by means of the independent engine 111.

In view of the foregoing, it will be apparent that the present invention provides a highly efficient and versatile centrifugal broadcast-type spreading machine which is characterized by the unique, yet mechanically simple, power-driven shaker pan arrangement which insures positive conveyance and displacement of materials deposited in the hopper laterally outwardly toward the discharge ports thereof. Further, through the use of the relatively vibrating or reciprocating valve plates and shutter plates, an efficient means is provided to insure against clogging or bridging of materials at and within the discharge outlets of the hopper which would otherwise cause a non-uniform flow of materials to the scattering fans and the uneven distribution of such materials over the terrain. Still another feature of the present machine is found in the mounting of the material-scattering fans for swinging movement to their inoperative positions at which a bucket or other suitable receptacle may be suspended below the discharge outlets of the hopper to accurately calibrate the actual rate of flow of materials from the hopper for a given setting of the metering valve plates.

While a single preferred embodiment of the invention has been shown and described in detail, it will be understood that the same is susceptible of modification as to details of construction or design without departing from the spirit of the invention or scope of the following claims.

What I claim is:

1. In a spreader for fertilizer or the like; a wheel mounted frame adapted for attachment in trailing relation to a towing vehicle; an elongated material-receiving hopper mounted on said frame and extending transversely of the normal path of movement of said frame over the terrain, said hopper having an open bottom; a pair of longitudinally aligned shaker pans mounted on said hopper in closing relation to the open bottom thereof and for limited reciprocating movement in a direction generally longitudinally of said hopper, one of said shaker pans having a bottom wall inclined downwardly and outwardly toward one end of said hopper and the other of said shaker pans having a bottom wall inclined downwardly and outwardly toward the opposite end of said hopper, the bottom walls of said shaker pans being formed with material-discharging outlets disposed, respectively, toward the opposite ends of said hopper; manually adjustable valve means positioned beneath said material-discharging outlets and operable to control the flow of materials therefrom; power-driven means connected with said shaker pans and operable to impart relatively high speed reciprocating movement thereto and to thereby cause materials received in said hopper to be conveyed by said shaker pans toward said outlets; and a pair of power-driven, rotary, material-scattering devices positioned, respectively, beneath said outlets and operable to centrifugally broadcast materials discharged from said outlets.

2. A spreader for fertilizer or the like, as defined by claim 1, wherein each of said material-scattering devices is carried for rotation upon an arm pivotally connected with said frame, and wherein each of said material-scattering devices and its associated arm may be swung in a substantially horizontal plane between an operative position beneath one of said outlets and an inoperative position remote to said last-named outlet.

3. A spreader for fertilizer or the like, as defined by claim 1, wherein each of said shaker pans is suspended beneath the open bottom of said hopper by sets of pivotal rocker arms arranged to permit relatively short stroke, arcuate swinging movement of said pan in a plane parallel to the longitudinal axis of said hopper in response to forces imparted thereto by said power-driven means.

4. In a tractor-drawn spreader for pulverulent materials; a wheel mounted frame; a relatively elognated, vertically arranged, material-receiving hopper mounted on said frame and extending transversely thereof, said hopper having opposite end walls, oppositely inclined, downwardly convergent side walls and an open bottom; a partition wall extending transversely between the side walls of said hopper in the lower central region thereof and dividing the lower region of said hopper into two opposite end sections; a pair of relatively shallow, longtudinally aligned shaker pans positioned, respectively, beneath said hopper on opposite sides of said partition wall and in closing relation to the open bottom of said hopper; relatively spaced sets of rocker arms pivotally connected with said hopper and said shaker pans and supporting said shaker pans for limited reciprocating movement in a direction generally longitudinally of said hopper, said shaker pans being formed with bottom walls, respectively, inclined downwardly and outwardly toward the opposite ends of said hopper, the bottom walls of said shaker pans being formed with discharge outlets adjacent the opposite ends of said hopper; power-driven, motion transmitting means connected with said shaker pans and operable to impart relatively short stroke, reciprocating movement thereto; shutter means positioned beneath the discharge outlets of said shaker pans and operable to control the gravitational discharge of materials from said outlets; means connected with said shutter means for moving the latter between opening and closing positions with respect to the outlets of said shaker pans, but restraining said shutter means against reciprocating movement with said shaker pans; and a power-driven, rotary, material scattering device supported by said frame and disposed below each of said outlets and said shutter means and operable to centrifugally broadcast materials discharged from each of said outlets.

5. A spreader for pulverulent materials as defined in claim 4, including a manually adjustable slide valve positioned between each of the outlets of said shaker pans and said shutter means and adjustable to vary the effective size of said outlet, said slide valves being mounted in association with said shaker pans and being movable therewith upon reciprocation of said shaker pans.

6. A spreader for pulverulent materials as defined in claim 4, wherein each of said material-scattering devices is supported for rotation upon a horizontally swinging arm pivotally connected with said frame and is bodily movable with said arm to a position remote from its associated discharge outlet, and wherein said hopper is provided with bracket means adjacent the outlets of said shaker pans operable to support a discharge-measuring receptacle beneath each of said outlets when said material-scattering device is moved to said remote position.

7. In a spreader for pulverulent materials; a wheel-mounted frame; a relatively elongated, material-receiving hopper formed with relatively opposed, upstanding end and side walls and a centrally disposed, transversely extending partition wall dividing the hopper internally of the lower region thereof into two opposite end sections, both of said end sections being open at the bottom thereof; a pair of relatively spaced, longitudinally aligned shaker pans suspended from said hopper in coextensive, closing relation to the open bottoms of the end sections of said hopper, each of said shaker pans being formed with a bottom wall sloping downwardly and outwardly from the central portion of said hopper and each of said shaker pans being mounted for limited reciprocating movement longitudinally of said hopper, the bottom walls of said shaker pans being formed with discharge outlets adjacent the end walls of said hopper; a pair of drive rods having outer ends connected respectively with said shaker pans exteriorly of said hopper; an oscillating member pivotally supported beneath the central portion of said hopper and connecting said drive rods at the inner ends thereof, said oscillating member and said drive rods being arranged to reciprocate said shaker pans in opposite longitudinal directions upon movement of said oscillating member; a connecting rod pivotally connected with said oscillating member; a rotary eccentric drivingly connected with said connecting rod and operable to impart relatively high speed, short stroke, oscillating movement to said oscillating member; rotary, material-scattering devices mounted on said frame and arranged to centrifugally broadcast materials discharged from the outlets of said shaker pans; and a common drive means supported by said frame and operable to impart simultaneous rotary motion to said eccentric and to said material-scattering devices.

8. In a spreader for pulverulent materials; a frame for attachment to a vehicle; an elongated, material-receiving hopper mounted on said frame and extending transversely of the normal path of movement of an associated vehicle over the terrain, said hopper having an open top and bottom; material-discharging outlet means provided in the bottom of said hopper adjacent each end thereof; a pair of reciprocatory shaker pans positioned in the bottom of said hopper and operable to convey materials deposited in said hopper outwardly toward said outlet means; manually adjustable valve means positioned beneath said outlet means and operable to control the flow of materials therefrom; power-driven means connected with each of said shaker pans and operable to impart relatively high speed reciprocating movement thereto; and a pair of power-driven, material-scattering devices carried by said frame beneath said outlet means, each of said devices being rotatable in a substantially horizontal plane and being operable to centrifugally broadcast materials discharged from said outlet means.

References Cited in the file of this patent

UNITED STATES PATENTS

| | | |
|---|---|---|
| 880,561 | Mitchell | Mar. 3, 1908 |
| 1,345,362 | Gueldenhaar | July 6, 1920 |
| 2,526,081 | Meincke | Oct. 17, 1950 |

FOREIGN PATENTS

| | | |
|---|---|---|
| 140,901 | France | Feb. 1, 1881 |
| 30,046 | Norway | Oct. 6, 1919 |
| 186,484 | Switzerland | Dec. 1, 1936 |